(12) United States Patent
Filsfils et al.

(10) Patent No.: US 9,294,392 B2
(45) Date of Patent: Mar. 22, 2016

(54) IDENTIFYING, TRANSLATING AND FILTERING SHARED RISK GROUPS IN COMMUNICATIONS NETWORKS

(71) Applicant: Cisco Technology, Inc., San Jose, CA (US)

(72) Inventors: Clarence Filsfils, Brussels (BE); George L. Swallow, Boston, MA (US)

(73) Assignee: Cisco Technology, Inc., San Jose, CA (US)

(*) Notice: Subject to any disclaimer, the term of this patent is extended or adjusted under 35 U.S.C. 154(b) by 251 days.

(21) Appl. No.: 14/047,981

(22) Filed: Oct. 7, 2013

(65) Prior Publication Data

US 2014/0101335 A1 Apr. 10, 2014

Related U.S. Application Data

(60) Provisional application No. 61/710,121, filed on Oct. 5, 2012.

(51) Int. Cl.
*H04L 12/723* (2013.01)
*H04L 12/721* (2013.01)
(Continued)

(52) U.S. Cl.
CPC ............... *H04L 45/50* (2013.01); *H04L 41/00* (2013.01); *H04L 45/02* (2013.01); *H04L 45/38* (2013.01); *H04L 45/42* (2013.01); *H04L 45/44* (2013.01); *H04L 45/58* (2013.01); *H04L 45/66* (2013.01); *H04L 69/166* (2013.01); *H04L 45/34* (2013.01)

(58) Field of Classification Search
CPC . H04L 12/5689; H04L 12/4645; H04L 12/56; H04L 2012/6443; H04L 45/00; H04L 45/04; H04L 49/3009
See application file for complete search history.

(56) References Cited

U.S. PATENT DOCUMENTS 6,882,627 B2 4/2005 Pieda et al. .................... 370/248
6,904,462 B1 6/2005 Sinha ............................ 709/226
(Continued)

FOREIGN PATENT DOCUMENTS

WO WO 2014/188638 11/2014 .............. G06F 11/36

OTHER PUBLICATIONS

Marco Tacca et al., Local Detection and Recovery from Multi-Failure Patterns in MPLS-TE Networks, IEEE ICC 2006, p. 658-663.
(Continued)

*Primary Examiner* — Warner Wong
(74) *Attorney, Agent, or Firm* — Campbell Stephenson LLP

(57) ABSTRACT

A method, apparatus, and computer-readable storage medium for processing shared risk group (SRG) information in communications networks are disclosed. The method includes receiving network information comprising SRG information from a second domain at a first domain, obtaining at least one SRG identifier by processing the SRG information, and processing the at least one SRG identifier, the processing using processing criteria. The apparatus includes a network interface adapted to receive network information comprising shared risk group information, a processor coupled to the network interface and configured to execute one or more processes, and a memory coupled to the processor and adapted to obtain at least one SRG identifier by processing the SRG information and to process the at least one SRG identifier using processing criteria. The computer-readable storage medium is configured to store program instructions that when executed are configured to cause the processor to perform the method.

12 Claims, 10 Drawing Sheets

(51) Int. Cl.
*H04L 12/751* (2013.01)
*H04L 12/717* (2013.01)
*H04L 29/06* (2006.01)
*H04L 12/24* (2006.01)
*H04L 12/775* (2013.01)

(56) References Cited

U.S. PATENT DOCUMENTS

| | | | |
|---|---|---|---|
| 7,035,209 B2 | 4/2006 | Dang et al. | 370/228 |
| 7,209,975 B1 * | 4/2007 | Zang et al. | 709/238 |
| 7,457,237 B2 | 11/2008 | Zetterlund et al. | 370/225 |
| 7,551,550 B2 | 6/2009 | Sinha | 370/217 |
| 7,593,340 B2 | 9/2009 | Li et al. | 370/235 |
| 7,697,455 B2 * | 4/2010 | Sadanada | 370/254 |
| 7,885,179 B1 | 2/2011 | Bryant et al. | 370/216 |
| 2002/0131424 A1 | 9/2002 | Suemura | 370/400 |
| 2002/0191545 A1 * | 12/2002 | Pieda et al. | 370/238 |
| 2003/0043747 A1 | 3/2003 | Edwin et al. | 370/238 |
| 2003/0131130 A1 | 7/2003 | Malkosh | 709/238 |
| 2003/0147352 A1 | 8/2003 | Ishibashi et al. | 370/248 |
| 2003/0174644 A1 | 9/2003 | Yagyu | 370/228 |
| 2004/0205237 A1 | 10/2004 | Doshi et al. | 709/241 |
| 2004/0205239 A1 * | 10/2004 | Doshi et al. | 709/241 |
| 2005/0073958 A1 | 4/2005 | Atlas et al. | 370/238 |
| 2005/0088965 A1 | 4/2005 | Atlas et al. | 370/216 |
| 2006/0004916 A1 | 1/2006 | Caviglia et al. | 709/223 |
| 2006/0114818 A1 * | 6/2006 | Canali et al. | 370/216 |
| 2006/0140190 A1 * | 6/2006 | Lee | 370/395.3 |
| 2007/0058607 A1 | 3/2007 | Mack-Crane et al. | 370/351 |
| 2008/0002664 A1 * | 1/2008 | Li et al. | 370/351 |
| 2009/0103442 A1 | 4/2009 | Douville | 370/248 |
| 2010/0061720 A1 | 3/2010 | Fiaschi | 398/2 |
| 2010/0302935 A1 | 12/2010 | Zhang et al. | 370/218 |
| 2011/0080827 A1 | 4/2011 | Zetterlund et al. | 370/225 |
| 2011/0087784 A1 | 4/2011 | Liu | 709/226 |
| 2011/0280580 A1 | 11/2011 | Wexler | 398/79 |
| 2012/0014690 A1 * | 1/2012 | Gruber | H04B 10/07951 398/25 |
| 2012/0185229 A1 | 7/2012 | Perrett | 703/13 |

OTHER PUBLICATIONS

D. Awduche et al., Overview and Principles of Internet Traffic Engineering, RFC 3272, Copyright © The Internet Society (2002), p. 1-71.

D. Papadimitriou et al., Inference of Shared Risk Link Groups, Internet Draft, Nov. 2001, p. 1-17.

Kompella & Rekhter, Routing Extensions in Support of Generalized Multi-Protocol Label Switching (GMPLS), Copyright © The Internet Society (2005), p. 1-27.

* cited by examiner

| Translation Table | |
|---|---|
| External-domain SRG identifier | Local-domain SRG ID |
| ED0001 | LD01 |
| ED0008 | LD02 |
| ED0214 | LD03 |
| ED0070 | LD04 |
| ... | ... |

Fig. 4A

| Translation table with summarization | |
|---|---|
| External domain SRG identifier | Local-domain SRG ID |
| ED0001 | LD01 |
| ED0002 | LD01 |
| ED0003 | LD01 |
| ED0004 | LD01 |
| ED0005 | LD02 |
| ED0006 | LD01 |
| ED0007 | LD02 |
| ED0008 | LD02 |
| ED0009 | LD05 |
| ED0010 | LD05 |
| ... | ... |

Fig. 4B

IDENTIFYING, TRANSLATING AND FILTERING SHARED RISK GROUPS IN COMMUNICATIONS NETWORKS

RELATED APPLICATION

This application claims domestic benefit under Title 35 of the United States Code §119(e) of U.S. Provisional Patent Application Ser. No. 61/710,121, entitled "Method For Using Chain Routing," filed Oct. 5, 2012, and naming Daniel C. Frost, Stewart F. Bryant, Clarence Filsfils, John W. Evans, and George L. Swallow as the inventors.

TECHNICAL FIELD

This disclosure relates to the field of communications networks, and more particularly relates to identification and use of shared risk groups in these networks.

BACKGROUND

A computer network may for some purposes be usefully described in terms of a physical layer and a logical layer. The physical layer includes the hardware for transmission of information-carrying signals over, for example, electrical cable, fiber optic line or wireless links. This physical layer corresponds to the physical layer, or Layer 1, of the seven-layer Open System Interconnection (OSI) reference model. The logical layer generally includes the protocols used for addressing in the network and routing of information from its source to its destination. The logical layer generally corresponds to the data link layer (Layer 2) and/or the network layer (Layer 3) of the OSI model. Part of the routing function of the logical layer in a computer network is re-routing to avoid disruption caused by a network failure, or to recover from such a disruption. The re-routing involves identifying a backup path for the information being routed. The feasibility of a backup path, however, may depend upon the reason for the network failure. If the failure of the original routing path is due to a broken fiber optic cable, for example, a backup path using the same cable will naturally fail as well. The logical layer routing algorithms are generally unaware of the correspondence between logical network nodes and their underlying physical equipment, and in fact both physical and logical network configurations may be continually changing.

The concept of a shared risk group (SRG) has developed to assist routing algorithms in finding backup paths less likely to be affected by the same network failure afflicting the corresponding primary path. An SRG may also be called a shared risk resource group (SRRG), and is generally a group of routes or paths all of which include a particular network resource, such that all of the paths in the group share the risk presented by a failure of the underlying resource. More specific types of SRG have been defined according to the type of network resource in question, including shared risk link group (SRLG), shared risk node group (SRNG), and shared risk equipment group (SREG). An SRLG is a group of routes having a common link, such as a span of optical fiber. Similarly, an SRNG is a group of routes traversing the same node, and the routes in an SREG share an equipment resource, such as a multiplexer in a wavelength division multiplexed network. "SRG" as used herein may refer to any of these types of shared risk groups. (In some other contexts, including the generalized multi-protocol label switching ("GMPLS") architecture, "SRLG" may be used to refer to shared risk groups in general.) Because an SRG can be associated with any network resource shared by multiple network routes, a given route may be a member of multiple SRGs. With information on the SRGs associated with potential routes, a routing algorithm can attempt to identify a backup path that is not in the same SRGs as its corresponding primary path; such a backup path would not share the same network resources as the primary path and therefore not be affected by the same network failures.

Association of SRGs with specific network resources is typically done within a particular routing domain. A routing domain as used herein refers to a collection of interconnected network nodes under a common administration for purposes of network configuration. A routing domain may also be referred to as an "autonomous system" (AS). A large network may include many routing domains, each configured by a corresponding individual or organization. (Networks that come under common ownership or administration through, for example, a corporate acquisition process may continue to operate as separate routing domains based on the way they were originally configured.) SRG identifiers may be assigned manually by an administrator for the routing domain, or may in some cases be automatically assigned by network node equipment within the domain.

BRIEF DESCRIPTION OF THE DRAWINGS

The present disclosure may be better understood, and its numerous objects, features, and advantages made apparent to those skilled in the art by referencing the accompanying drawings.

FIG. 4A illustrates exemplary entries in an SRG identifier translation table.

FIG. 4B illustrates exemplary entries in an SRG identifier translation table with summarization.

DETAILED DESCRIPTION

Figure 1:
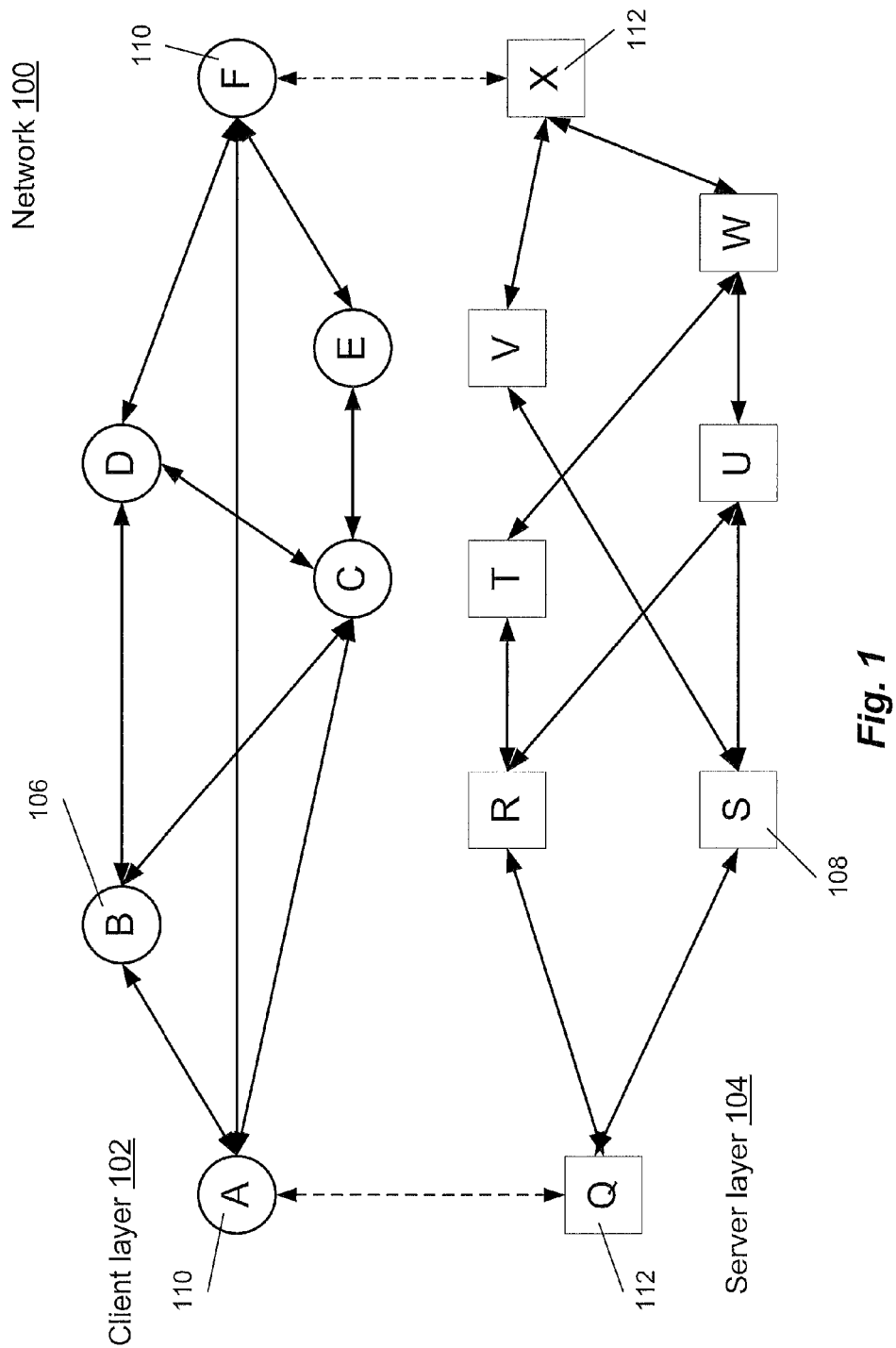
FIG. 1 is a block diagram illustrating an example of a network architecture including a client layer and a server layer.

Processing of shared risk groups in communications networks is disclosed. In one embodiment, network information comprising shared risk group (SRG) information is received from a second domain at a first domain. At least one SRG identifier is obtained by processing the SRG information. The SRG identifier is processed and may be stored in response to a determination of processing criteria being met. Processing of the SRG identifier may include translating an external domain SRG identifier into a local-domain SRG identifier. Processing may also include filtering of the SRG identifiers of incoming data based on priority or redundancy. Processing may further include associating additional information with an SRG identifier, such as a routing domain identifier or priority index. Processing criteria may include criteria useful in deciding whether to retain SRG information, such as priority threshold values or translation table relationships.

In general, an SRG may be defined whenever there are multiple routes or paths in a "client" layer sharing a risk of failure associated with a resource provided by an underlying "server" layer. In some embodiments, for example, both the client and server layers could involve logical paths and resources, or both could involve physical paths and resources. In addition to its application in a multilayer context, this client/server framework could be applied within a single layer. Two routing domains within a layer may operate in a client/server relationship, for example.

The methods and systems disclosed herein may therefore be applicable to any practical combinations of a client and server in packet, time-division multiplexing (TDM), and optical networks, either between different layers or within a single layer. Such client and server layers may include, without limitation: Internet Protocol (IP), Multiprotocol Label Switching (MPLS), Ethernet, Optical Transport Network (OTN), Synchronous Optical Networking/Synchronous Digital Hierarchy (SONET/SDH), and dense wavelength division multiplexing (DWDM). Variants of these layer technologies which may also act as a client or server layer as described herein include the IP/MPLS and MPLS-Transport Protocol (MPLS-TP) variants of MPLS and the "QinQ" and Provider Backbone Bridge (PBB) variants of Ethernet. Packet transport layers may include Ethernet and MPLS-TP, TDM transport layers may include OTN and SONET/SDH, and DWDM may be considered an optical transport layer. Exemplary combinations of client and server in a multilayer system include Ethernet (client) over OTN (server) and MPLS-TP (client) over OTN (server).

As noted above, an SRG could potentially be associated with any link, node, or other network resource along a route that is shared with other routes. A given route or path through a network could therefore be a member of many SRGs, potentially hundreds. Identification of the SRGs associated with a route may be shared between routing domains, such that the applicable SRG identifiers may be stored in each routing domain in, for example, a link state database associated with the IGP for that domain. Routing and storage of such large numbers of SRG identifiers may cause a significant increase in storage requirements for the network and may also impact network performance in areas such as routing protocol computation speed and speed of "flooding" needed information throughout the network. Moreover, many of the SRGs established in one domain may have little relevance for the routes in a different domain, especially in the case of domains in different layers of a multilayer system.

In addition, lack of coordination between routing domains in configuration of SRGs can result in multiple SRG identifiers being associated with a single network resource, or in association of the same SRG identifier with two or more different network resources. The IETF proposed standard RFC 4202 describes an SRLG as being "identified by a 32 bit number that is unique within an IGP domain," allowing for the possibility of non-unique identification in the case of multi-domain networks. This proposed standard, "Routing Extensions in Support of Generalized Multi-Protocol Label Switching (GMPLS)" by K. Kompella et al., RFC 4202, October 2005, available at https://datatracker.ietf.org/doc/rfc4202/, is hereby incorporated by reference as though fully set forth herein. This non-unique identification of SRLs can thwart attempts by a routing protocol to specify backup paths diverse from their corresponding primary paths.

This disclosure describes methods and systems for including additional information in or associated with SRG identifiers, and for translating and/or reducing the number of SRG identifiers at certain boundaries between routing domains. Additional information in an SRG identifier may include an AS identifier, or domain identifier, which may in some embodiments be assigned by the entity responsible for the network resource associated with the SRG (the resource at risk). In an embodiment, this AS identifier is stored in a 4-byte AS field in a larger extended-SRG identifier format. Alternatively or in addition to an AS identifier, additional information in an SRG identifier may include priority information reflecting the relative importance of the SRG and its associated network resource. In an embodiment, the priority information is stored in a 3-bit priority field in a extended-SRG identifier format. Alternatively, the priority information may be encoded into 3 bits of a 32-bit SRG identifier, with an additional bit used as an indicator of whether priority information is included. In yet another embodiment, a flag associated with a type-length-value (TLV) data structure used by GMPLS to carry a set of 32-bit SRG identifiers associated with a route may be used to indicate whether priority information is included in the SRG identifiers within the TLV.

In some embodiments additional information may be associated with an SRG identifier without encoding of the information directly into the SRG identifier or the standard SRLG TLV element. For example, an AS identifier may be associated with one or more corresponding SRG identifiers in a data structure maintained by a network controller or other processing system associated with the network. Similarly, priority information could be associated with SRG identifiers in such a data structure. In a further embodiment of an extended SRG identifier, an AS identifier or domain identifier may be concatenated with a standard 32-bit SRG identifier to form an extended SRG identifier.

A translation function may be installed in connection with certain routing domain boundaries to translate inconsistently-assigned SRG identifiers into consistently assigned identifiers. This may be particularly useful when the routing domain boundary is between different layers in a multilayer network. Such translation may allow diverse backup routes to be specified and facilitate routing optimization in multilayer networks. For example, a translation function could be used in connection with the boundaries between optical nodes and packet nodes in a network using generalized multi-protocol label switching (GMPLS). This could allow translation of inconsistent SRG identifiers assigned by, for example, different providers of DWDM circuits into a consistent set of SRG identifiers used by the Internet service provider (ISP) leasing the DWDM circuits. In an embodiment, a similar translation function could be used in connection with a boundary between routing domains within a single layer, if SRG identifiers are assigned inconsistently between the routing domains. These translation functions could in some embodiments be combined with filtering of priority information contained in the SRG identifiers in the manner discussed above. In such embodiments, translation could be performed for only the highest-priority SRGs.

In addition to the translation function described above, a condensing or summarizing function for reducing the number of SRG identifiers passed across a boundary between routing domains is disclosed herein. Like the translation function, the summarizing function may be used in connection with a boundary between layers in a multilayer network, or in some embodiments a boundary between domains within a layer. In an embodiment, the summarizing function removes from a group of SRG identifiers to be passed to a client layer all but one of a group of SRG identifiers associated with multiple network resources located along the same non-branched segment of a route within a server layer. The summarizing function may in some embodiments be combined with the translation function described above.

FIG. 1 illustrates an embodiment of a network architecture suitable for implementation of the methods and systems described in this disclosure. Network 100 can be described with a 2-layer model. Client layer 102 includes nodes 106 labeled A through F, and server layer 104 includes nodes 108 labeled Q through X. In one example of such a multilayer network, client layer 102 may be an IP/MPLS layer and server layer 104 may be a DWDM layer. In such an embodiment nodes 106 would represent routers and nodes 108 would be optical nodes such as optical switches. The arrows between routers A through F would represent data connections rather than physical ones, and the arrows between optical nodes Q through X would represent optical fiber connections. Inter-layer signaling connections between nodes A and Q and between nodes F and X could be implemented in such an embodiment using a GMPLS User to Network Interface (UNI), in which the client layer UNI-C node is considered a "user" of the server network. In the embodiment of FIG. 1, routers A and F may be configured as UNI-C nodes 110 which interact with elements Q and X of the server network, configured as UNI-N nodes 112. The connections between nodes in FIG. 1 may carry all kinds of information, depending on the network configuration, including the user data or "payload" as well as network information concerning operation of the network. As used herein, "network information" includes information regarding shared risk groups in a network, or "shared risk group information". Shared risk group (SRG) information may include shared risk group identifiers and any other data or information associated with shared risk groups.

At the client layer, multiple data connection routes between nodes 106 can be used to connect one node to another. To connect nodes A and F, for example, possible routes include ABDF, ACEF, ABCEF, ABCDF, and ABD-CEF. Each of these routes in the client layer is associated with a specific path in the server layer, although depending on the routing scheme used the client layer routing control plane may not have knowledge of that server layer path.

Definition of SRGs for network resources (links, nodes, equipment) or other aspects of the server network that could lead to failure can help the client layer routing control plane recover from failures. SRG information can help the control plane determine backup routes less likely to be affected by the same server-layer events that may cause a primary route failure. In practice, however, there are difficulties with SRG-aided routing, especially in the case of fully automated approaches to obtaining and using SRG information.

One difficulty is that the SRG associated with a given network resource or feature may be defined by both a client layer routing domain and an underlying server layer routing domain. The SRG associated with a single feature could therefore be assigned a different name or identifier by each layer, or the same SRG identifier could be assigned by each layer to a completely different feature. This lack of unique definition of SRGs may cause confusion and error in backup route determination.

A more significant problem when SRG information is passed between layers is that the number of features for which the server layer may provide SRG information may be much greater than the client layer needs or can effectively use. Actual networks of course have many more nodes than shown in the simplified representation of FIG. 1, and data may be routed through large numbers of nodes, making route calculations very complex. Moreover, the number of network features that may potentially be associated with an SRG can be extremely large. In an embodiment for which FIG. 1 represents an IP over DWDM implementation, the optical network at the server layer can have many additional features not shown in FIG. 1, such as, for example, amplifiers, replaced fiber sections and topographical features along the fiber lengths between nodes. Although any such feature could be assigned an SRG associated with its potential failure, providing SRGs for all of the possible features to the client layer can provide an overwhelming amount of data for a routing algorithm to process. In addition, SRGs for features located in close proximity along server-layer routes may often provide redundant information, most of which is not helpful at the client layer.

Figure 2:
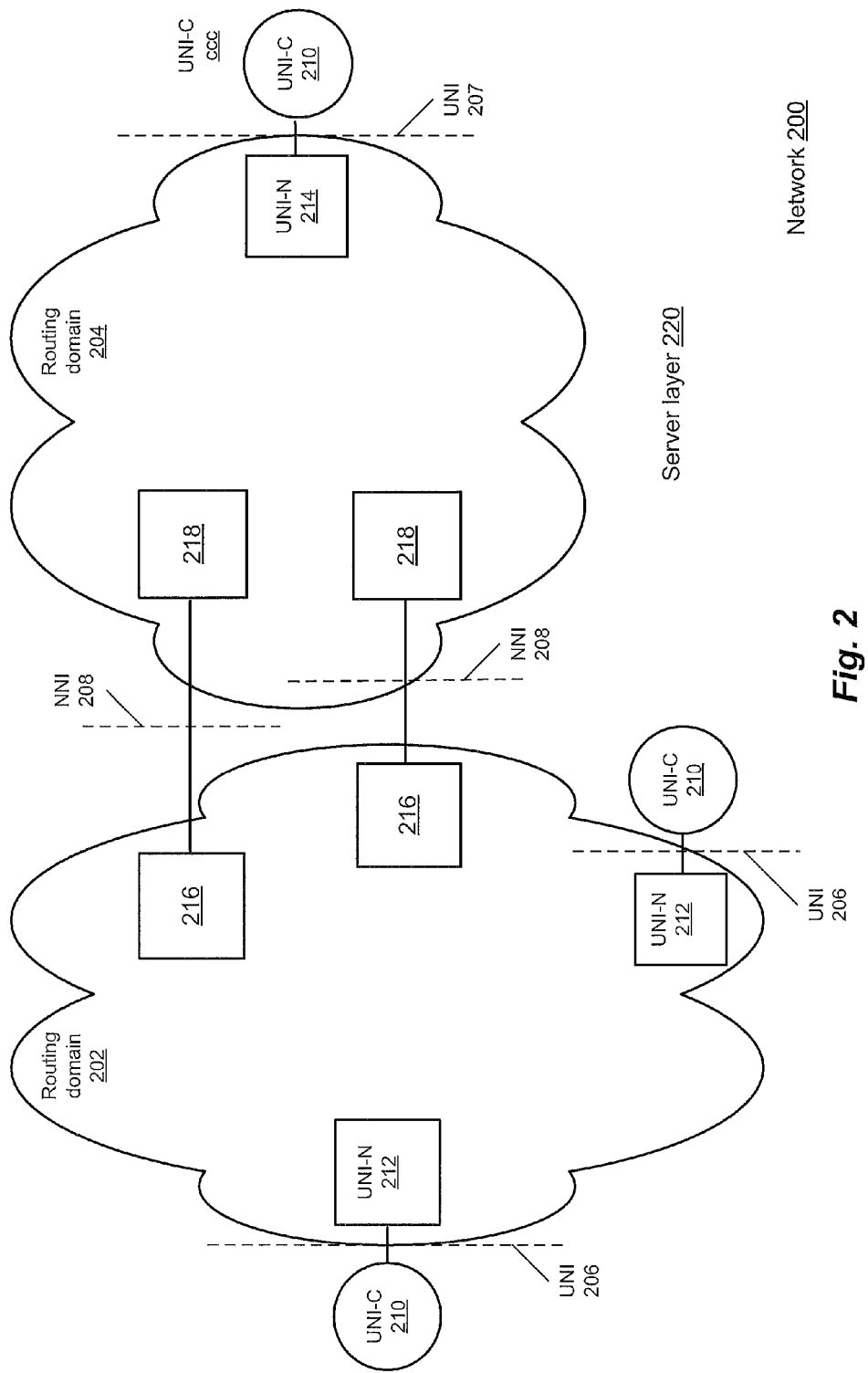
FIG. 2 is a block diagram illustrating a boundary between two routing domains within a server layer of a network having architecture similar to that of FIG. 1.

A different view of a portion of a network having an architecture similar to that of FIG. 1 is shown in FIG. 2. Server layer 220 of network 200 includes two routing domains 202 and 204. In the embodiment of FIG. 2, nodes 212 in routing domain 202 and node 214 in routing domain 204 are configured as UNI-N nodes for communication with client layer UNI-C nodes 210 across UNIs 206 between routing domain 202 and the client layer and UNI 207 between routing domain 204 and the client layer. UNI-N nodes 212 and 214 are similar to UNI-N nodes 112 of FIG. 1, and UNI-C nodes 210 are similar to UNI-C nodes 110 of FIG. 1. Nodes 216 at the boundary of routing domain 202 are connected to nodes 218 at the boundary of routing domain 204 across Network to Network Interfaces (NNIs) 208. Other nodes within routing domains 202 and 204, and the interconnections between nodes within the domains are not shown in FIG. 2.

NNI 208 is an example of a boundary between different routing domains within a single layer of a network. Routes within server layer 220 may in some embodiments cross this routing domain boundary and multiple other such boundaries. Because SRGs are configured within each routing domain, non-unique SRG identifiers may result, causing problems for routing algorithms in a manner similar to that described with respect to FIG. 1.

Figure 3:
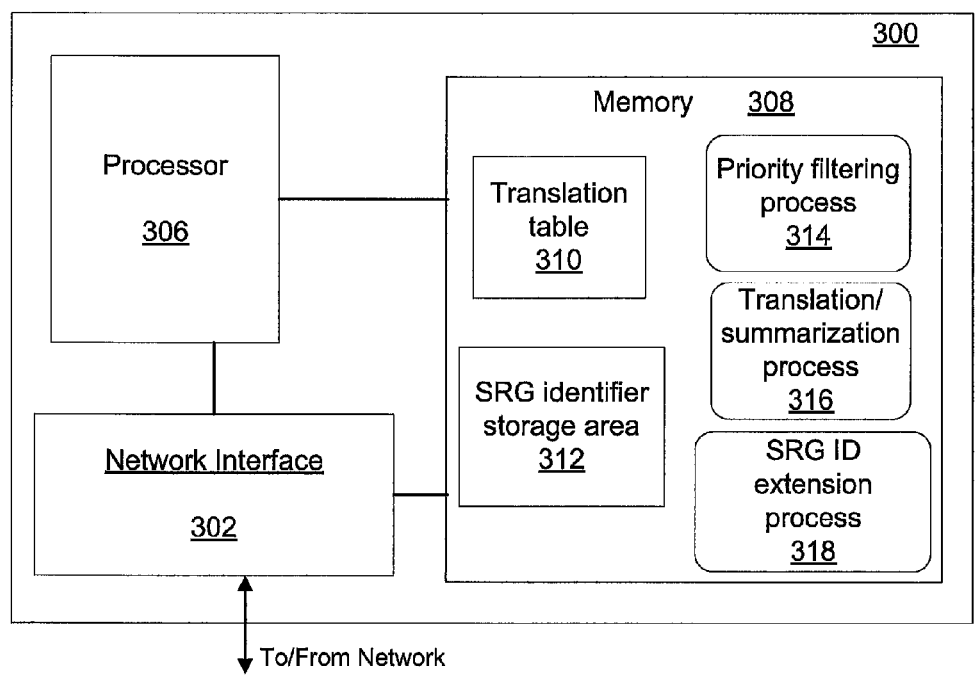
FIG. 3 is a block diagram illustrating an embodiment of an apparatus that can be used in conjunction with a network like that of FIG. 1.

A block diagram of an apparatus that may be used in conjunction with a network to implement the methods described herein is shown in FIG. 3. Apparatus 300 of FIG. 3 is configured for connection to a network, but is not necessarily a node within the network. Such an apparatus could form a portion of a network controller or a server running a virtual networking application. Alternatively, apparatus 300 could be implemented using a more traditional network device such as a router. In embodiments for which apparatus 308 is implemented as a router, the router is preferably a router at a boundary between domains, such as UNI-C routers 210 of FIG. 2 at the client layer to server layer interface, or routers 216 and 218 of FIG. 2 at a routing domain interface within the server layer.

Apparatus 300 includes network interface 302 for connection to one or more networks. Network interface 302 contains the mechanical, electrical and signaling circuitry for communicating data over physical links coupled to a network such as network 100 of FIG. 1. Network interface 302 may be configured to transmit and/or receive data using a variety of protocols and protocol suites, including MPLS, GMPLS, TCP/IP, SONET/SDH, Ethernet, OTN, and so forth. Network interface 302 may also be used to implement one or more virtual network interfaces, such as for Virtual Private Network (VPN) access. Network interface 302 is coupled to processor 306 and may also be coupled to memory 308 of apparatus 300.

Memory 308 includes a plurality of storage locations addressable by processor 306 and network interface 302 for storing software programs and data structures associated with the methods described herein. Memory 308 includes SRG identifier storage area 312 for storing SRG identifiers that may be used by routing algorithms and other control plane functions. SRG identifier storage area 312 may include any data structures suitable for storing SRG identifiers in a form useful for network processes. In an embodiment, SRG identifier storage area 312 may be within a link state database for a routing domain of a network.

SRG identifier storage area 312 may be configured to store SRG identifiers in various suitable formats. In one embodiment, storage area 312 is adapted to store each SRG identifier as an unstructured 32-bit value. In another embodiment, SRG identifier storage area 312 is adapted to store an SRG identifier as an extended SRG identifier including a standard 32-bit SRG identifier concatenated with an identifier associated with the routing domain of the network resource associated with the SRG identifier. In an embodiment, the identifier associated with the routing domain is an AS identifier. An AS identifier or AS number may in some cases be assigned to a routing domain by a telecommunications provider and be publicly available. In other cases, particularly for private numbers, AS numbers or other routing domain identifiers may not be publicly known. In an embodiment, a routing domain identifier may be assigned through operation of apparatus 300 when the domain identifier is not publicly known. The domain identifier may be assigned in a way that makes it unique over an area of concern for the network in question. In some embodiments, the domain identifier may be assigned to be globally unique. In an embodiment of the extended SRG identifier including a domain identifier, the domain identifier is represented as a 4-byte value.

In some embodiments an extended SRG identifier may also include priority information or a priority index. The priority information may in some embodiments be encoded into a designated portion of the standard 32-bit SRG identifier, preferably a 3-bit portion. In such an embodiment, an additional portion of the standard SRG identifier may be designated for storing a pattern to signal whether priority information is included in the SRG identifier. Alternatively, a flag in a type-length-value structure for SRG identifiers could be set to indicate whether priority information was included in the SRG identifiers.

In some embodiments, the extended SRG identifier may take the form of a type-length-value (TLV) structure having a sub-TLV domain identifier field. Such an embodiment may also include a priority information sub-TLV. In an embodiment, the priority sub-TLV may be a 3-bit field, and the domain identifier sub-TLV may be a 4-byte field.

In addition to SRG identifier storage area 312, memory 308 of apparatus 300 may in some embodiments include translation table 310. Translation table 310 relates an SRG identifier assigned by an external routing domain to a particular network feature to the corresponding local-domain SRG identifier assigned by the local domain to the same network feature. Translation table is used during execution of translation process 316. FIG. 4A illustrates example entries in translation table 310. In the embodiment of FIG. 4A the external domain SRG identifiers are generally larger numbers than the corresponding local-domain SRG IDs. In an embodiment, only a subset of the available external-domain SRG identifiers is entered into the translation table. The subset of external-domain SRG identifiers to be translated may be selected by a priority filtering process such as process 314 of FIG. 3. In some embodiments, translation table 310 may also be used to implement a condensing or summarization function. In such an embodiment, multiple external-domain SRG identifiers may be mapped to the same local-domain SRG identifier. Example entries for a translation table including summarization are shown in FIG. 4B. In an embodiment, the SRG identifiers included in translation table 310 are extended SRG identifiers as described above.

Figure 5A:
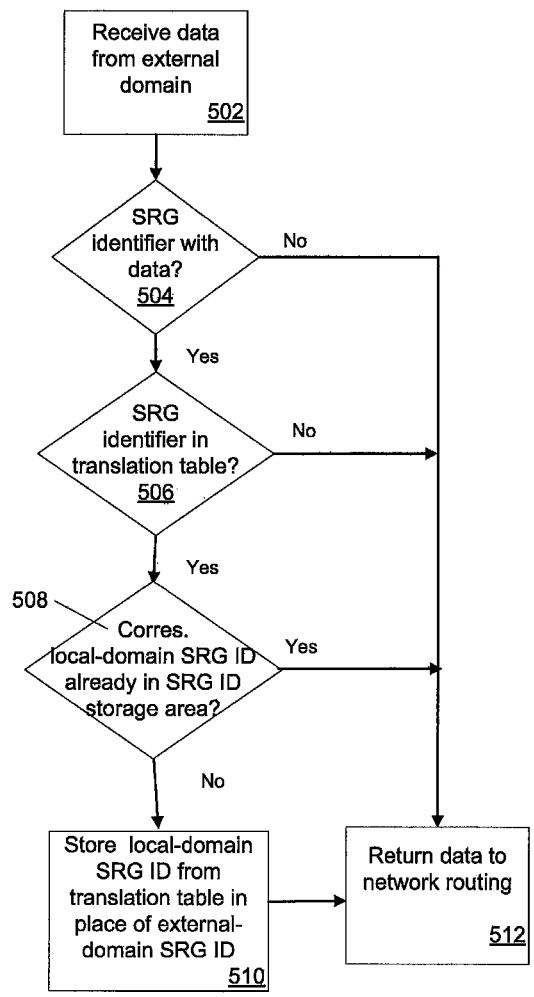
FIG. 5A is a flow chart illustrating an embodiment of a process for translation of SRG identifiers.
Figure 5B:
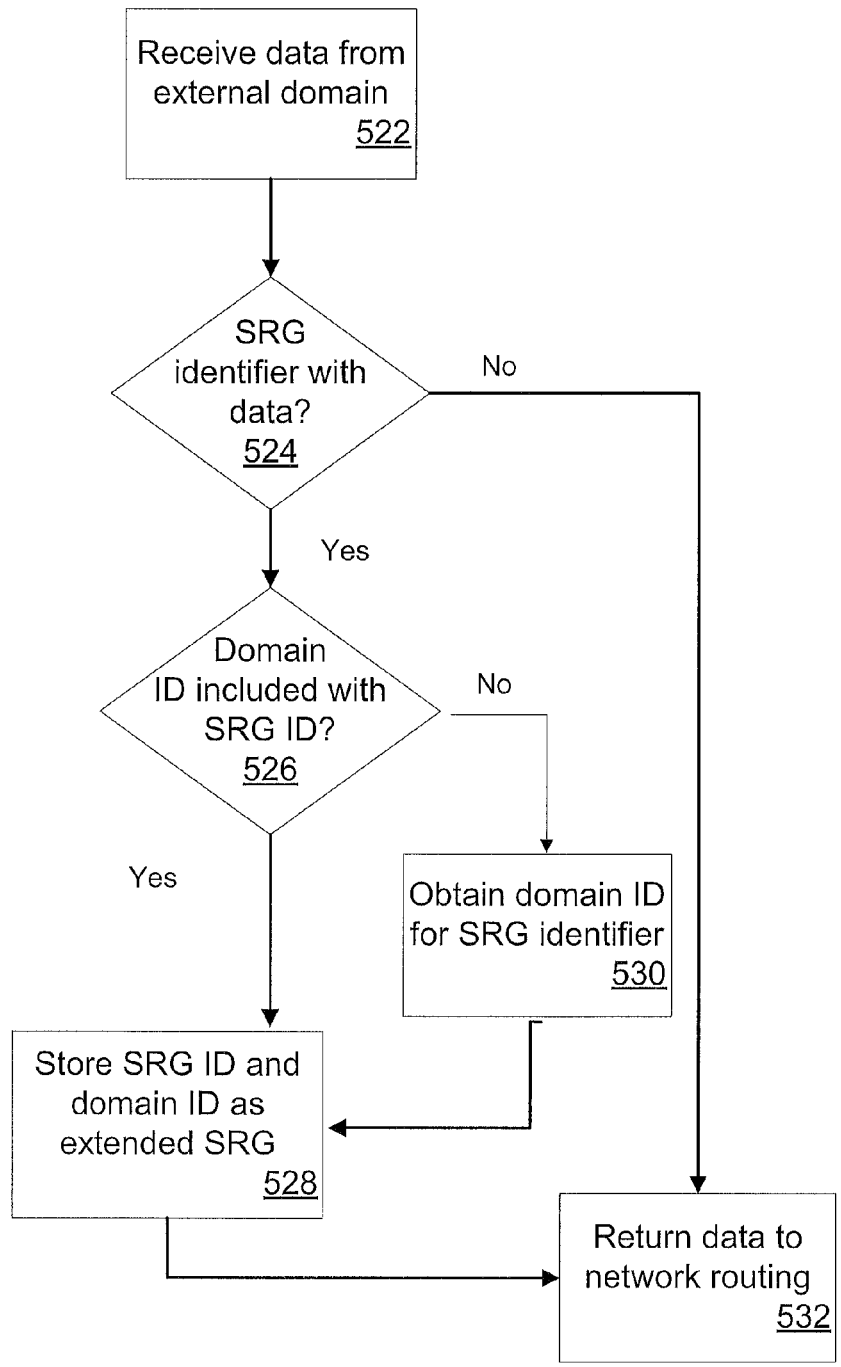
FIG. 5B is a flow chart illustrating an embodiment of a process for formation of an extended SRG identifier.
Figure 5C:
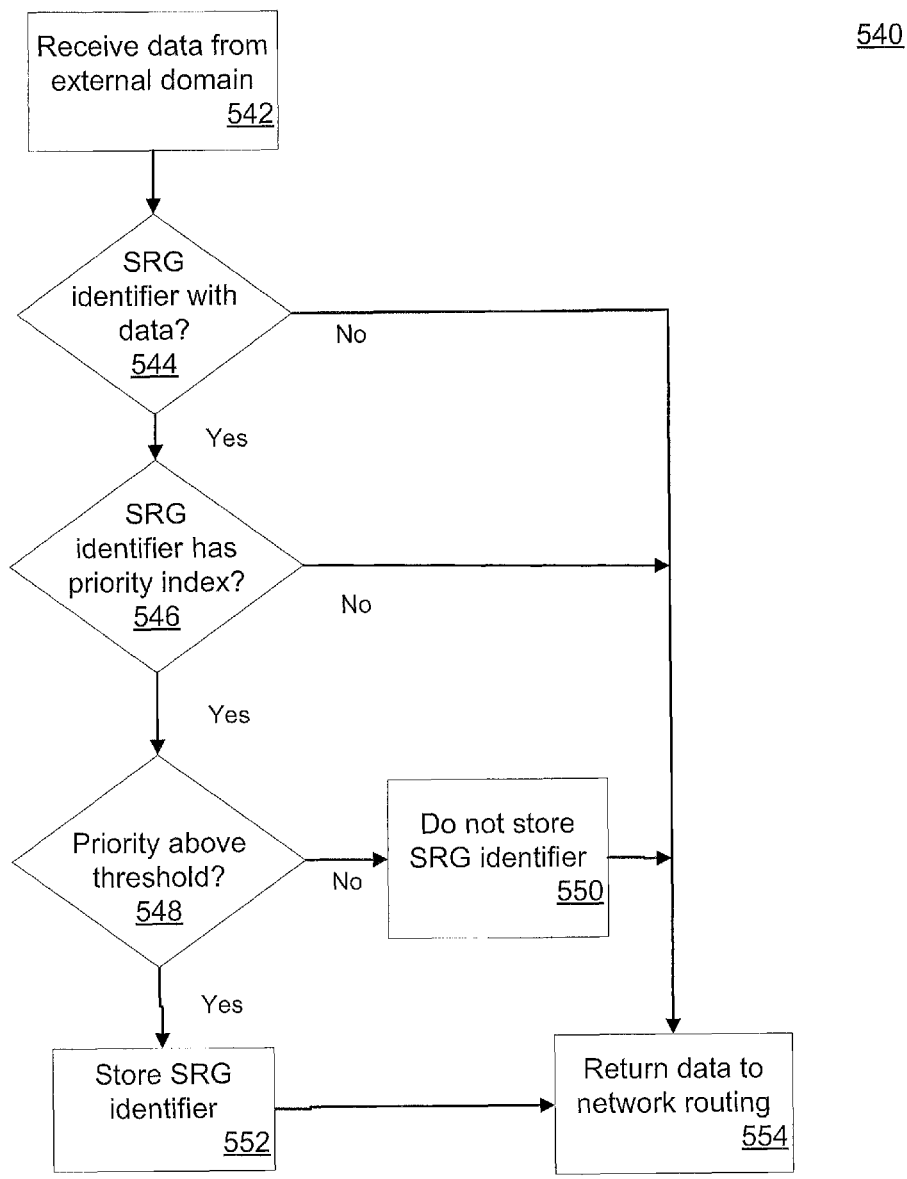
FIG. 5C is a flow chart illustrating an embodiment of a process for priority filtering of SRG identifiers.

In various embodiments, memory 308 of apparatus 300 further includes one or more of priority filtering process 314, translation/summarization process 316, and SRG ID extension process 318. Priority filtering process 314 contains computer executable instructions that when executed by processor 306 are operable to filter SRG identifiers of incoming data using priority information so that only SRG identifiers corresponding to network resources meeting a priority condition are stored. In this way, the number of SRG identifiers that must be processed by network routing protocols can be reduced. A flow diagram illustrating an embodiment of the method performed through execution of priority filtering process 314 is shown in FIG. 5C. Method 540 begins with receiving data from an external domain (step 542). In an embodiment for which method 540 is implemented on a router, the router may be at a boundary between routing domains within a network layer, or at a boundary between network layers, so that incoming data comes from an external domain. In an embodiment for which process 540 is implemented on, for example, a network controller or server, incoming data from a network node at a domain boundary may be transmitted to apparatus 300 over the network.

If the data includes an SRG identifier (decision box 544), the processor checks whether the SRG identifier has a priority index (box 546). In an embodiment in which a priority index is stored in designated bits within the standard 32-bit SRG identifier structure, checking whether the SRG identifier has a priority index may be done by checking a designated bit (or range of bits) for a pattern indicating that priority information is present. In an alternative embodiment, checking for priority information within a 32-bit SRG identifier may involve checking whether a flag is set in a TLV structure carrying one or more SRG identifiers. In still another embodiment, checking for priority information may involve checking a designated priority sub-TLV in an extended SRG identifier having a TLV structure. In some embodiments, priority information may be linked to an SRG identifier through a data structure rather than a direct inclusion in the SRG identifier. In such an embodiment, checking whether an SRG identifier has a priority index would involve checking the relevant data structure.

If the SRG does have a priority index, the processor checks whether the priority indicated by the index is above a designated threshold. The priority index and designated threshold may be established by an administrator based on any desired criterion, including, for example, probability of failure of a particular network feature, importance of routes including the feature, type of feature, etc. If the priority is determined to be above the designated threshold, the SRG identifier is stored in SRG identifier storage area 312 (step 552). If the priority is below threshold, the SRG identifier is not stored (step 550). In an embodiment, the SRG identifier used in process 540 is an extended SRG identifier including a domain identifier as discussed above.

Translation/summarization process 316 of FIG. 3 contains computer executable instructions that when executed by processor 306 are operable to use translation table 310 to translate external-domain SRG identifiers to local-domain SRG identifiers. A flow diagram illustrating an embodiment of the method performed through execution of translation/summarization process 316 is shown in FIG. 5A. Like method 540 of FIG. 5C, method 500 of FIG. 5A begins with receiving data from an external domain and determining whether the data includes an SRG identifier (steps 502, 504). If an SRG identifier is found, the processor determines whether the SRG identifier is in a translation table such as table 310 of FIG. 3 (decision box 506). If the SRG identifier of the received data is in the translation table, the processor determines whether the corresponding local-domain SRG identifier found in the translation table is already in the SRG ID storage area (decision box 508). Such duplication of local-domain SRG identifiers occurs when translation table 310 also implements a summarization function by mapping multiple external-domain SRG identifiers to a single local-domain SRG identifier. The local-domain SRG ID from the translation table is stored in the SRG identifier storage table only if it has not been stored there already (box 510), thereby eliminating duplicates caused by summarization. In an embodiment of method 500, the SRG identifier used is an extended SRG identifier including a domain identifier.

Memory 308 of FIG. 3 may also contain SRG ID extension process 318. Process 318 contains computer executable instructions that when executed by processor 306 are operable to form an extended SRG including a domain identifier. A flow diagram illustrating an embodiment of the method performed through execution of SRG ID extension process 318 is shown in FIG. 5B. Like methods 500 and 540, method 520 of FIG. 5B begins with receiving data from an external domain and determining whether the data includes an SRG identifier (steps 522, 524). If an SRG identifier is found, the processor determines whether a domain identifier such as an AS identifier is included with the SRG identifier (decision box 526). If a domain identifier is included, the processor stores the SRG identifier and domain identifier together in the SRG identifier storage space as an extended SRG identifier (box 528). If a domain identifier is not found, the processor obtains a domain identifier for the SRG identifier (box 530). If the domain identifier is publicly available, it may be obtained either automatically or manually by methods known to one of ordinary skill in the art. If the domain identifier is not publicly available, the processor may instead assign a domain identifier to the SRG identifier for use by the local domain. However it is obtained, the domain identifier is then stored with the SRG identifier as an extended SRG identifier.

The methods of FIGS. 5A, 5B and 5C may be combined in certain embodiments. For example, SRG extension method 520 of FIG. 5B may be performed prior to method 500 or 540, so that those methods are performed using an extended SRG. In such an embodiment, storage step 528 of method 520 would be replaced by either decision box 506, as a transition into translation/summarization method 500, or decision box 546 as a transition into priority filtering method 540. In other embodiments, priority filtering method 540 may be performed prior to method 500 or 520, to reduce the number of SRG identifiers those methods are required to process. In such an embodiment, storage step 552 of FIG. 5C may be replaced by either decision box 506, as a transition into translation/summarization method 500, or decision box 526, as a transition into SRG identifier extension method 520.

Processor 306 of apparatus 300 is configured to execute software programs and access data structures including those stored in memory 308. Processor 306 and memory 308 may take the various forms known in the art for computer systems in general, as described further below.

Example Network Device

Figure 6:
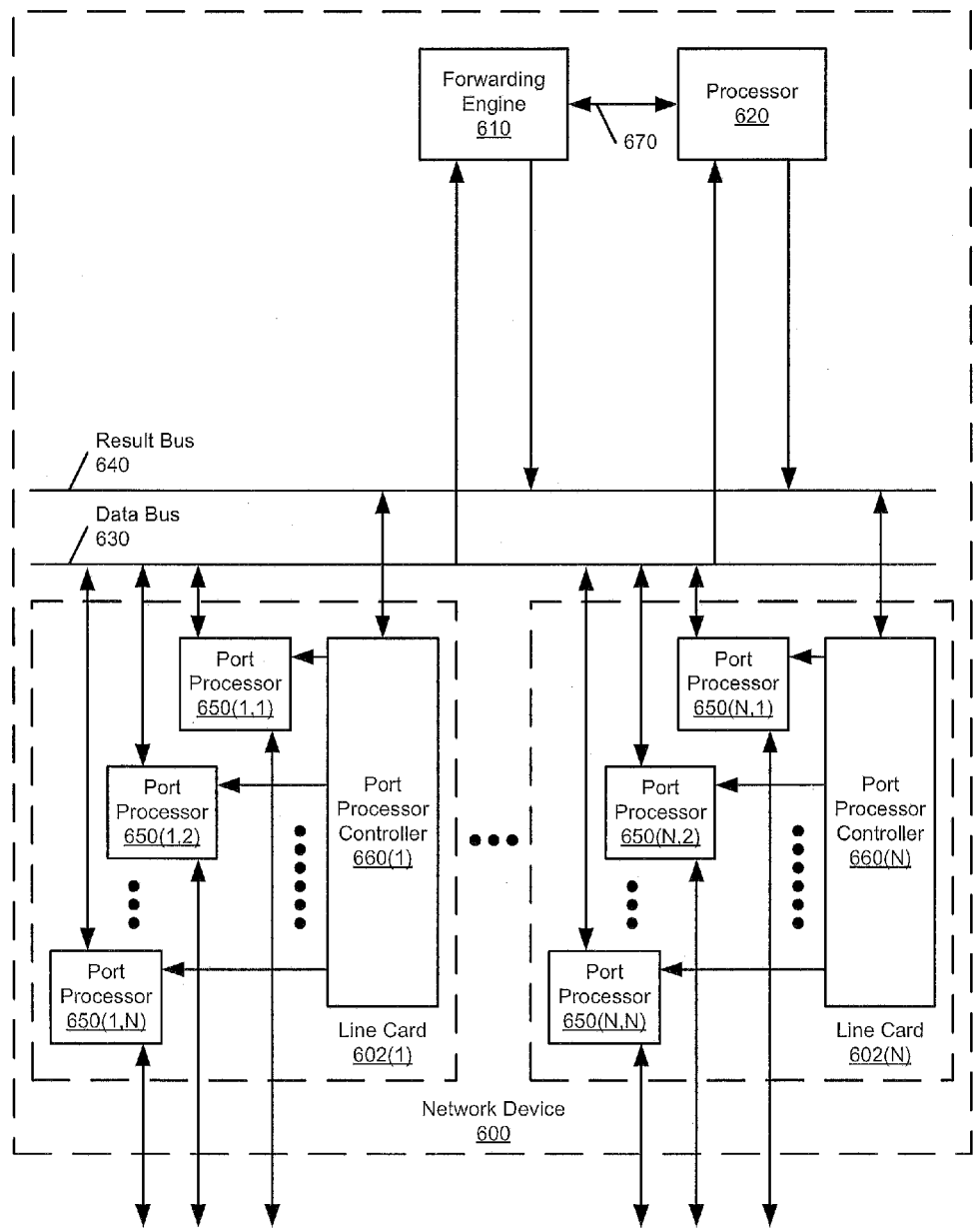
FIG. 6 is a block diagram illustrating an example of a network device that can be used to implement embodiments of the methods and devices disclosed herein.

FIG. 6 is a block diagram illustrating an example of a network device for a packet or frame network. In this depiction, network device 600 includes a number of line cards (line cards 602(1)-(N)) that are communicatively coupled to a forwarding engine 610 and a processor 620 via a data bus 630 and a result bus 640. Line cards 602(1)-(N) include a number of port processors 650(1,1)-(N,N) which are controlled by port processor controllers 660(1)-(N). It will also be noted that forwarding engine 610 and processor 620 are not only coupled to one another via data bus 630 and result bus 640, but are also communicatively coupled to one another by a communications link 670.

When a packet is received, the packet is identified and analyzed by a network device such as network device 600 in the following manner, according to embodiments of the present invention. Upon receipt, a packet (or some or all of its control information) is sent from the one of port processors 650(1,1)-(N,N) at which the packet was received to one or more of those devices coupled to data bus 630 (e.g., others of port processors 650(1,1)-(N,N), forwarding engine 610 and/or processor 620). Handling of the packet can be determined, for example, by forwarding engine 610. For example, forwarding engine 610 may determine that the packet should be forwarded to one or more of port processors 650(1,1)-(N,N). This can be accomplished by indicating to corresponding one(s) of port processor controllers 660(1)-(N) that the copy of the packet held in the given one(s) of port processors 650(1,1)-(N,N) should be forwarded to the appropriate one of port processors 650(1,1)-(N,N).

In the foregoing process, network security information can be included in a packet or frame sourced by network device 600 in a number of ways. For example, forwarding engine 610 can be used to detect the need for the inclusion of network security information in the packet, and processor 620 can be called into service to provide the requisite network security information. This network security information can be included in the packet during the transfer of the packet's contents from one of port processors 650(1,1)-(N,N) to another of port processors 650(1,1)-(N,N), by processor 620 providing the requisite information directly, or via forwarding engine 610, for example. The assembled packet at the receiving one of port processors 650(1,1)-(N,N) can thus be made to contain the requisite network security information.

In addition, or alternatively, once a packet has been identified for processing according to the methods described herein, forwarding engine 610, processor 620 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

It will be appreciated that, in light of the present disclosure, the variable identifier "N" is used in several instances in various of the figures herein to more simply designate the final element of a series of related or similar elements. The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Example Computer System

Figure 7:
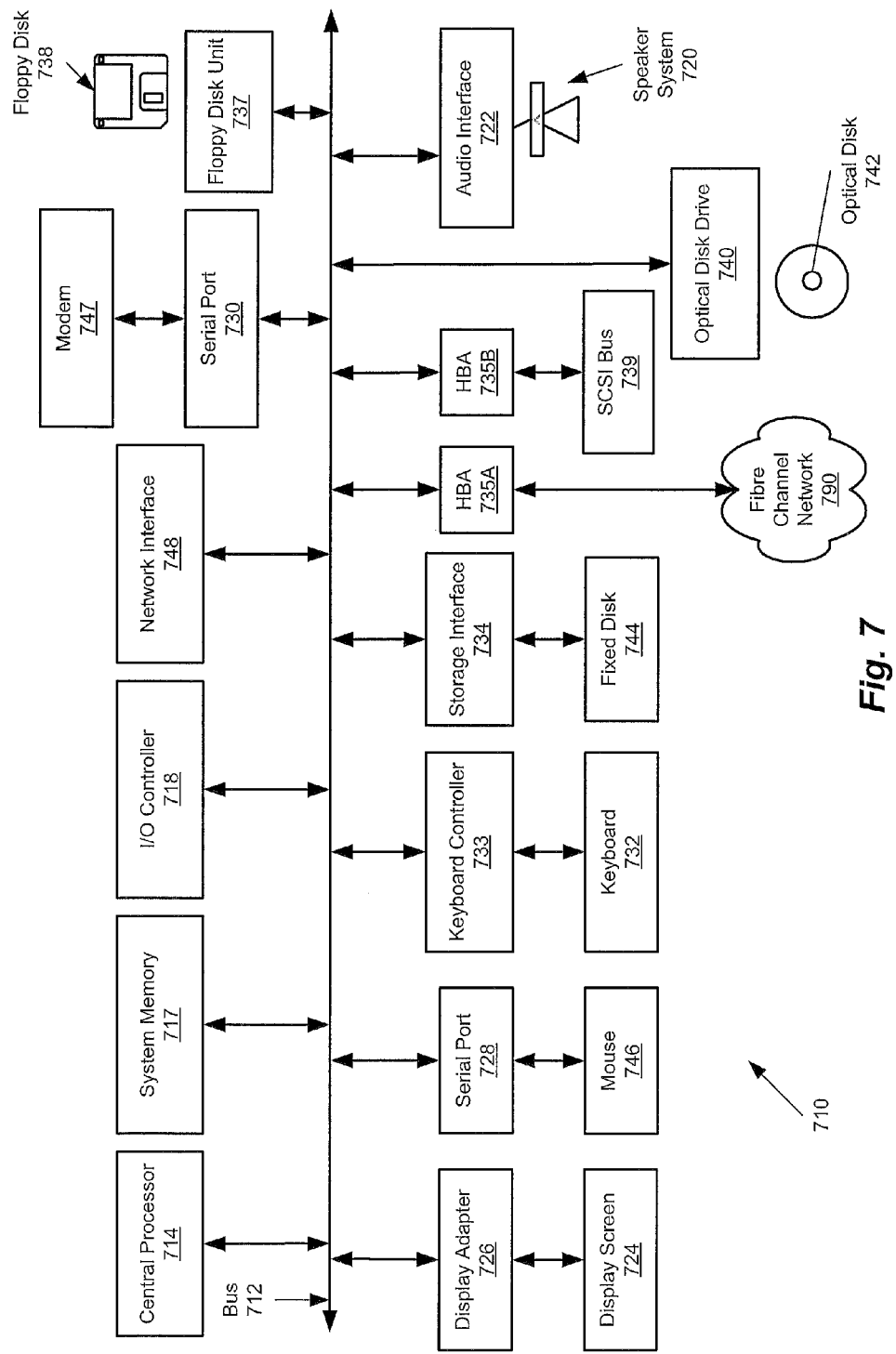
FIG. 7 is a block diagram depicting a computer system that can be used for implementing embodiments of the methods and devices disclosed herein.

FIG. 7 depicts a block diagram of a computer system 710 suitable for implementing aspects of the methods and systems described herein. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 710 are generally stored on and accessed from a computer-readable storage medium, such as a hard disk drive (e.g., fixed disk 744), an optical drive (e.g., optical drive 740), a floppy disk unit 737, or other computer-readable storage medium.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 7 need not be present to practice the systems described herein. The devices and subsystems can be interconnected in different ways from that shown in FIG. 7. The operation of a computer system such as that shown in FIG. 7 is readily known in the art and is not discussed in detail in this application. Code to implement the modules of the systems described herein can be stored in computer-readable storage media such as one or more of system memory 717, fixed disk 744, optical disk 742, or floppy disk 738. The operating system provided on computer system 710 may be MS-WINDOWS®, UNIX®, Linux®, or other operating system. Computer system 710 may also support a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer-readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Example Network Environment

Figure 8:
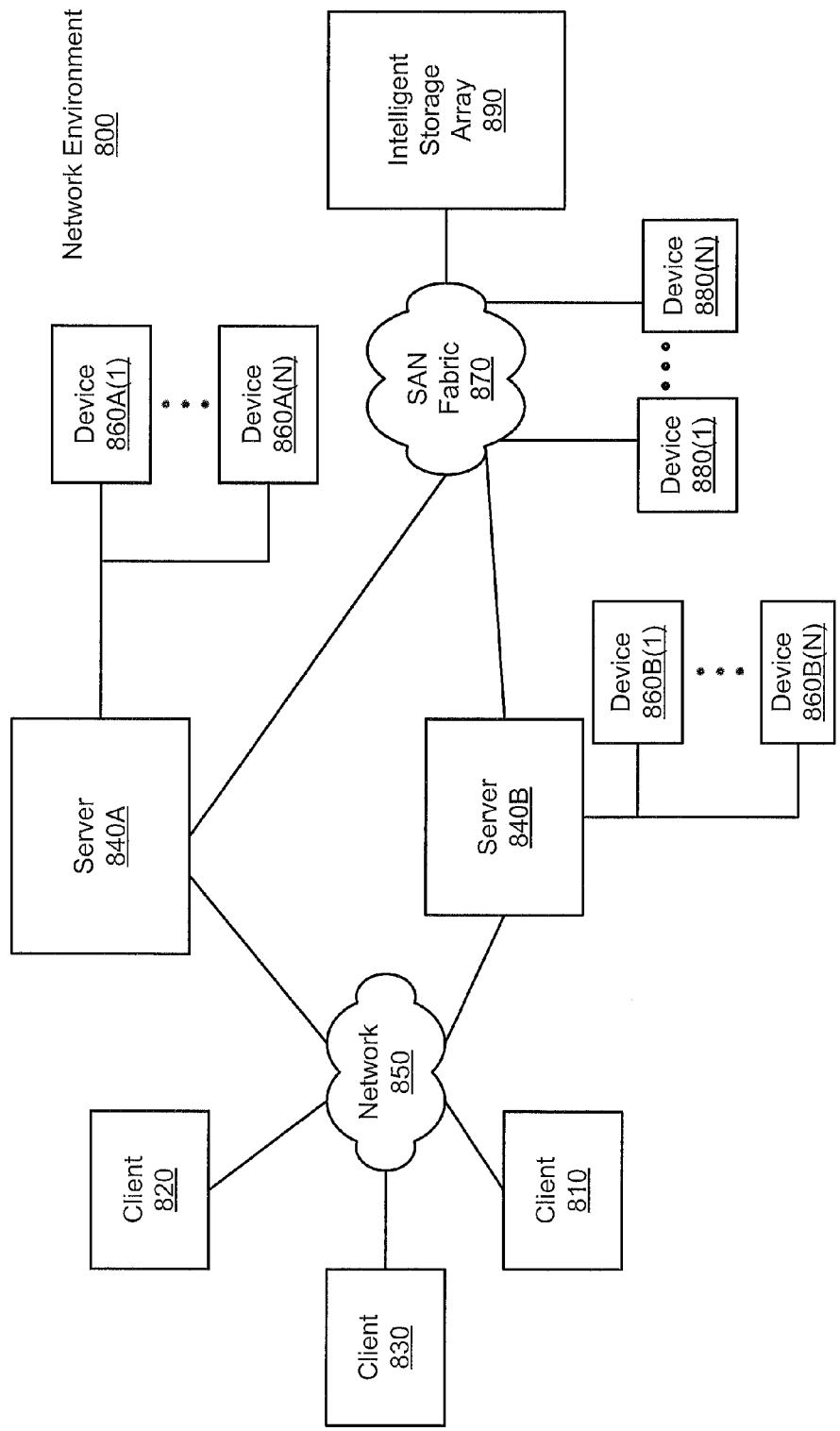
FIG. 8 is a block diagram illustrating an example of a network environment according to embodiments of the methods and devices disclosed herein.

FIG. 8 is a block diagram depicting a network environment suitable for implementation of the methods and devices described herein. Network environment 800 includes client systems 810, 820 and 830, as well as storage servers 840A and 840B, all coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710 of FIG. 7, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of a flow diagram such as those in FIG. 5 may be executed by a module (e.g., a software module) or a portion of a module or a computer system user using, for example, a computer system such as the computer system of FIG. 7. Thus, a method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file which may be a device, a terminal, a local or remote file, or other such devices. Other new and various types of computer-readable storage media may be used to store the software modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
receiving network information from a second domain at a first domain, the network information comprising shared risk group (SRG) information, wherein
the first domain and the second domain are comprised in a communications network;
obtaining at least one SRG identifier by processing the SRG information;
processing the at least one SRG identifier, the processing using processing criteria; and
in response to a determination of the processing criteria being met, storing the at least one SRG identifier.

2. The method of claim 1, wherein
said SRG information comprises information regarding routing paths affected by a network feature; and
said at least one SRG identifier comprises additional information regarding the network feature.

3. The method of claim 2, wherein said additional information comprises a routing domain identifier.

4. The method of claim 2, wherein said additional information comprises a priority index.

5. An apparatus comprising:
a network interface for connection to a communications network, wherein
the network interface is adapted to receive from a second domain at a first domain network information comprising shared risk group (SRG) information;
a processor coupled to the network interface and configured to execute one or more processes; and
a memory coupled to the processor and adapted to store program instructions operable when executed to
obtain at least one SRG identifier by processing the SRG information,
process the at least one SRG identifier using processing criteria, and
in response to a determination of the processing criteria being met, store the at least one SRG identifier.

6. The apparatus of claim 5, wherein
said SRG information comprises information regarding routing paths affected by a network feature; and
said at least one SRG identifier comprises additional information regarding the network feature.

7. The apparatus of claim 6, wherein said additional information comprises a routing domain identifier.

8. The apparatus of claim 6, wherein said additional information comprises a priority index.

9. A non-transitory computer-readable storage medium configured to store program instructions that, when executed on a processor, are configured to cause the processor to perform a method comprising:
receiving network information from a second domain at a first domain, the network information comprising shared risk group (SRG) information, wherein
the first domain and the second domain are comprised in a communications network;
obtaining at least one SRG identifier by processing the SRG information;
processing the at least one SRG identifier, the processing using processing criteria; and
in response to a determination of the processing criteria being met, storing the at least one SRG identifier.

10. The non-transitory computer-readable storage medium of claim 9, wherein
said SRG information comprises information regarding routing paths affected by a network feature; and
said at least one SRG identifier comprises additional information regarding the network feature.

11. The non-transitory computer-readable storage medium of claim 10, wherein said additional information comprises a routing domain identifier.

12. The computer-readable storage medium of claim 10, wherein said additional information comprises a priority index.

* * * * *